(No Model.)
4 Sheets—Sheet 1.
A. R. ARNOLD.
MACHINE FOR GROOVING TWIST DRILLS.
No. 301,322. Patented July 1, 1884.
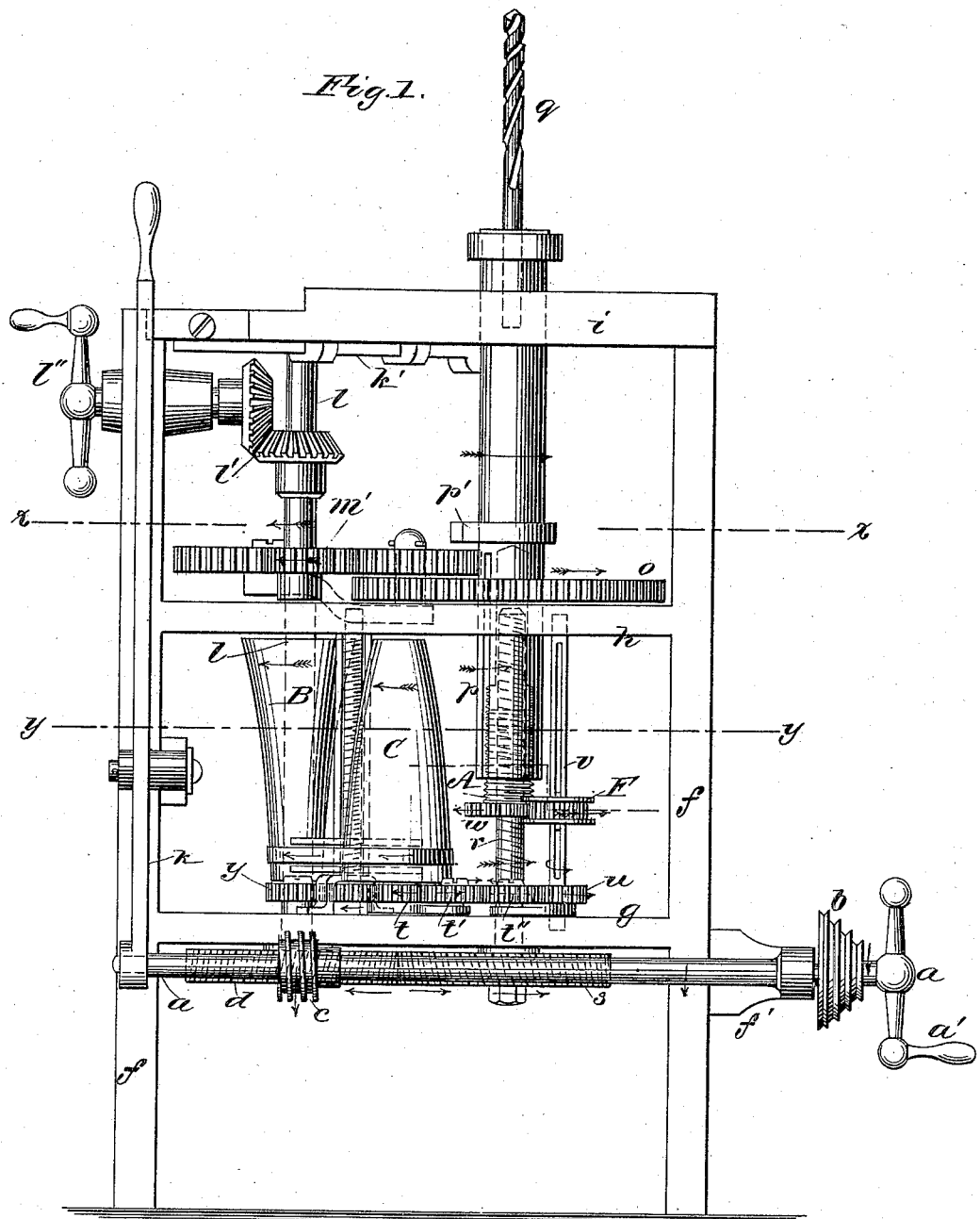

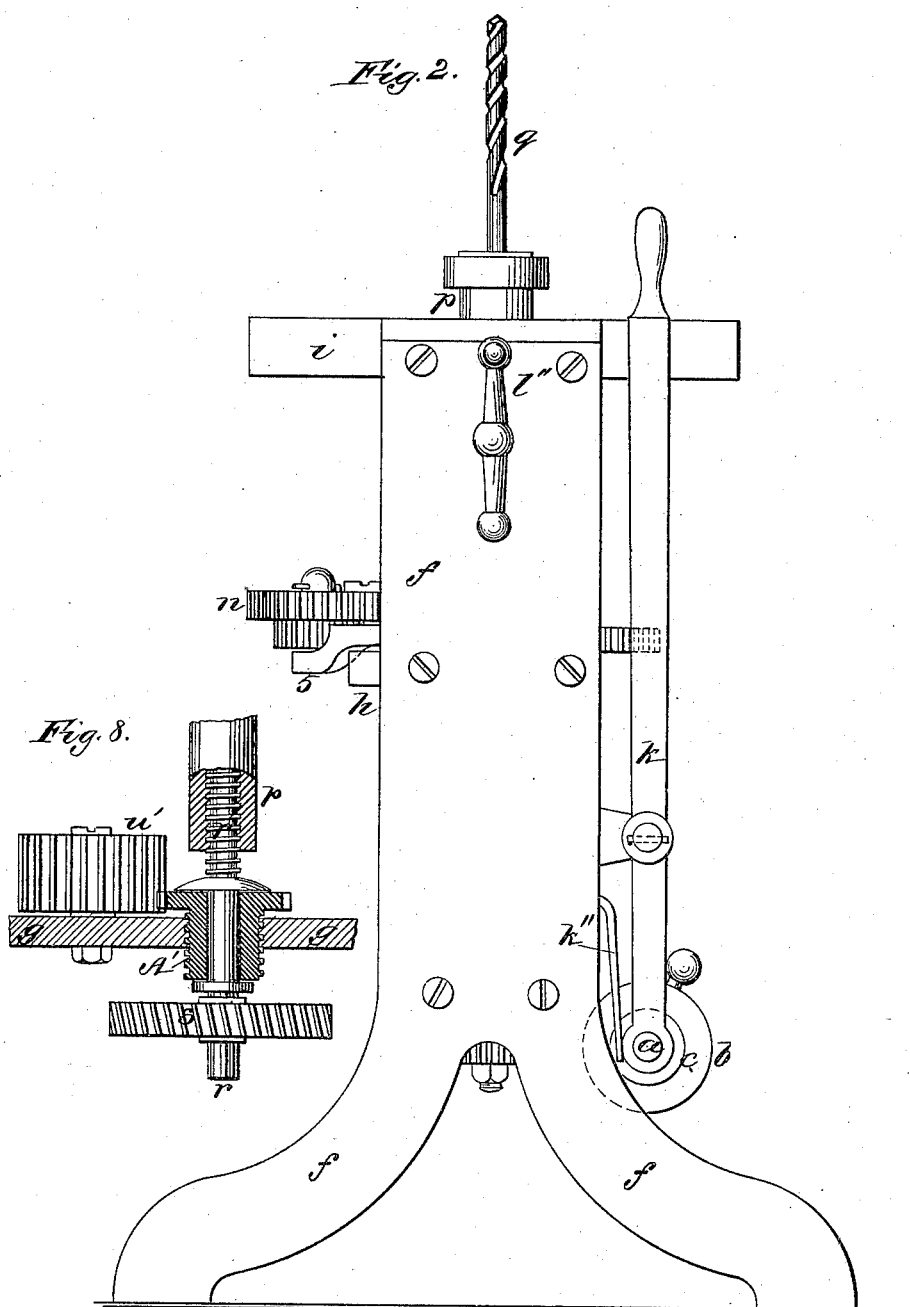

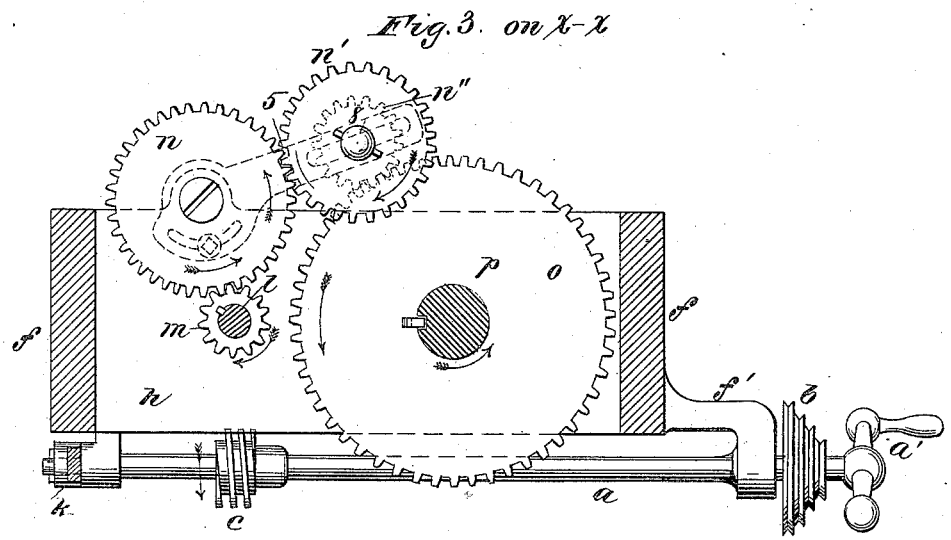
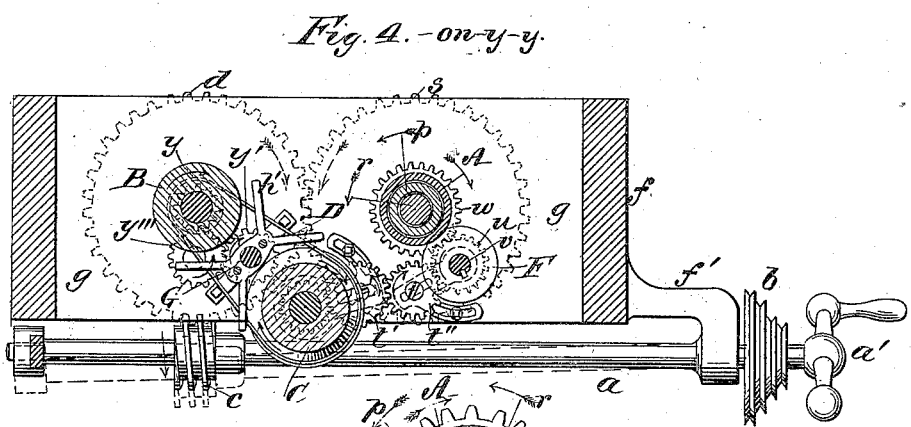
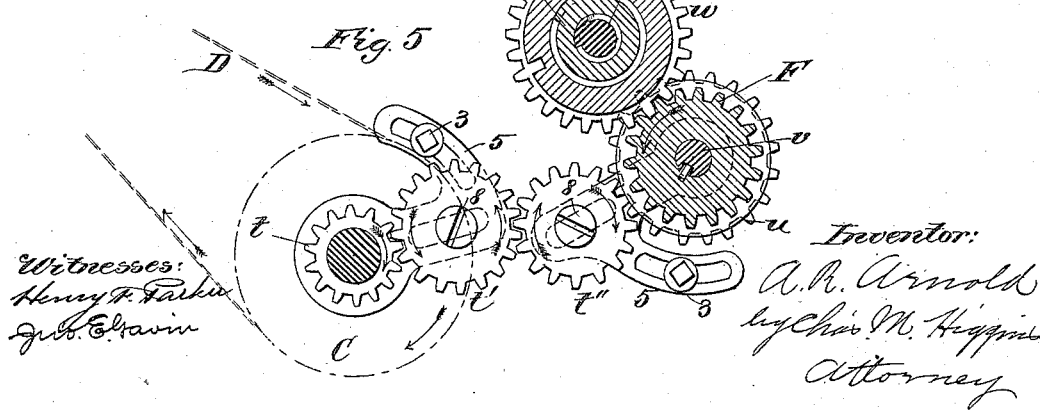

(No Model.) 4 Sheets—Sheet 4.
A. R. ARNOLD.
MACHINE FOR GROOVING TWIST DRILLS.
No. 301,322. Patented July 1, 1884.
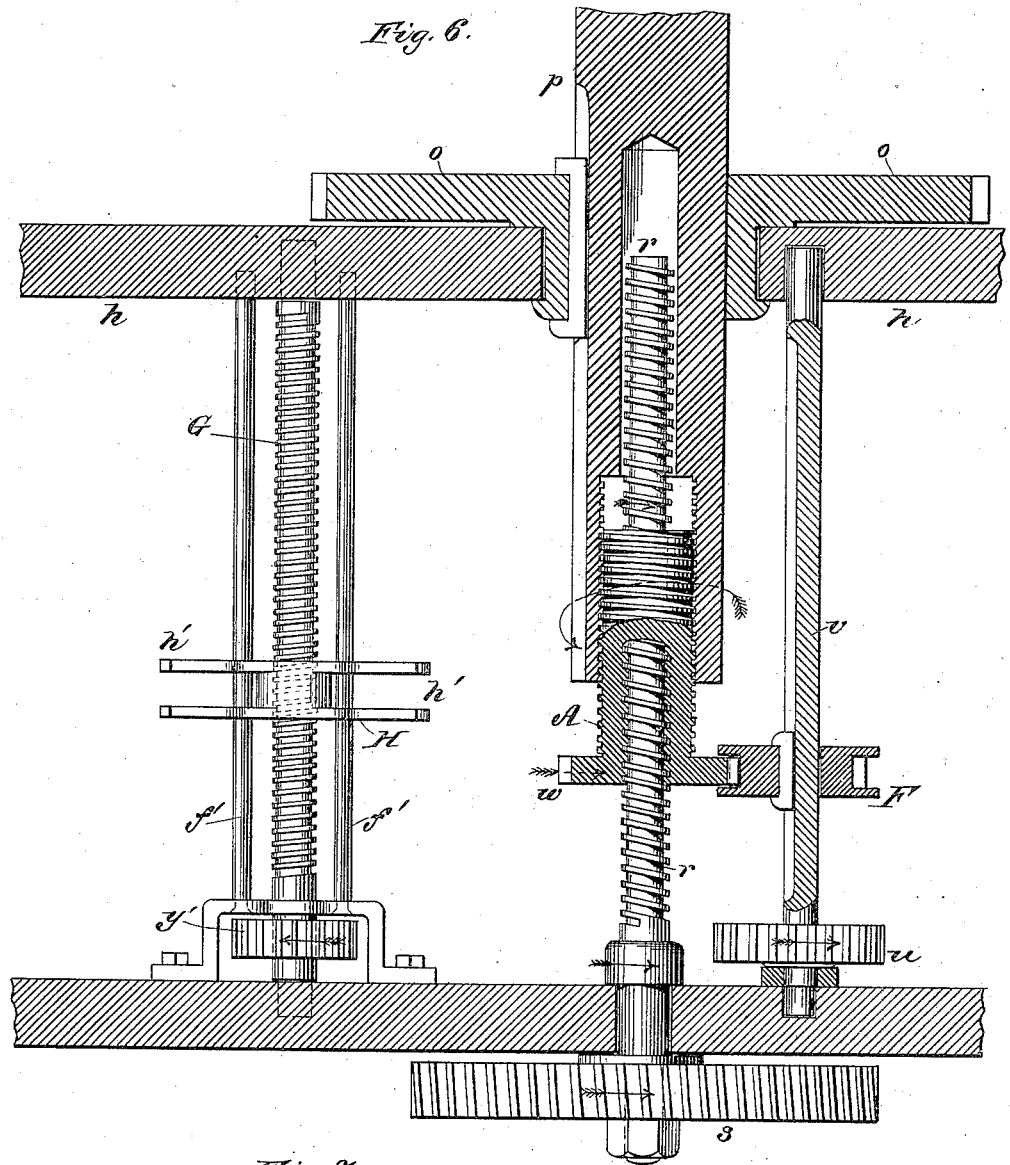
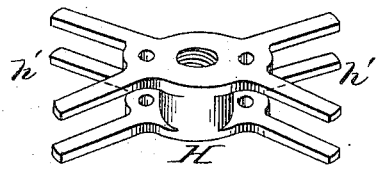
Witnesses:
Henry F. Parker
Jno. E. Gavin
Inventor:
Andrew R. Arnold
by Chas. M. Higgins
Attorney

UNITED STATES PATENT OFFICE.

ANDREW R. ARNOLD, OF PUTNAM, CONNECTICUT, ASSIGNOR TO STANDARD TOOL COMPANY, OF CLEVELAND, OHIO.

MACHINE FOR GROOVING TWIST-DRILLS.

SPECIFICATION forming part of Letters Patent No. 301,322, dated July 1, 1884.

Application filed July 21, 1883. (No model.)

*To all whom it may concern:*

Be it known that I, ANDREW R. ARNOLD, of Putnam, Windham county, Connecticut, have invented certain new and useful Improvements in Spiral Milling or Grooving Machines, of which the following is a specification.

My invention relates to that type of machine more especially designed for milling or cutting the spiral grooves in twist-drills—such as shown in a former patent issued to me and reissued August 10, 1869, No. 3,588. My former machine was adapted only for cutting spiral grooves of regular or uniform pitch, whereas my present machine is designed to cut spiral grooves with an increasing or decreasing pitch of any desired degree; and while it is more especially designed for grooving drill-blanks, it may of course be employed for any equivalent work for which it may be adapted.

The chief feature of my invention may therefore be stated to consist in the combination, with differential-screw mechanism or its equivalent for imparting a spiral movement to the drill-spindle, of reversed conical or tapering pulleys, and an automatically-shifting driving-belt moving thereon, through which power is imparted to the spirally-moving spindle, whereby the spiral motion imparted to the same is rendered of increasing or decreasing pitch, according to the action of the cones and the movable belt thereon, as hereinafter fully set forth.

My invention also consists in a special form of differential-screw mechanism, and in some minor features, as hereinafter set forth.

In the drawings annexed, Figure 1 presents a front elevation of the machine, and Fig. 2 an end elevation thereof. Fig. 3 is a sectional plan on line $x\,x$ of Fig. 1, and Fig. 4 is a sectional plan on line $y\,y$ of Fig. 1. Fig. 5 is a fragmentary sectional plan, showing the change-gearing and differential-screw mechanism between the cones and the drill-spindle, on an enlarged scale, supplemental to Fig. 4. Fig. 6 is an enlarged fragmentary vertical section, illustrating part of the automatic belt-shifting mechanism of the cones and the differential-screw mechanism of the drill-spindle. Fig. 7 is a perspective view of the belt-shifting slide. Fig. 8 shows a modification.

Referring to Figs. 1, 2, 3, and 4, it may be noted that the frame of the machine and the general form and arrangement of its mechanism is similar to what is shown in my former patent. The frame consists of the two end standards, $f\,f$, joined by the transverse shelf-like cross-bars $g\,h$, and surmounted by the table-like top $i$, which shelves and top form bearings to support the several shafts, spindles, and gearings of the machine, as illustrated.

In Figs. 1, 2, 3, and 4, $a$ indicates the driving-shaft of the machine, having the grooved pulley $b$, to which the driving-belt is applied, and also a hand-crank, $a'$, by which the shaft may be revolved by hand when required. This shaft is supported at the pulley end in a fixed bearing, $f'$, on the frame of the machine, and at the opposite end in the tip of a shifting-lever, $k$, in the same manner as shown in my former patent. This shaft is provided with a worm, $c$, which meshes with a spiral spur-gear wheel, $d$, which is fixed on the end of an upright shaft, $l$, below the lower shaft $g$, which shaft rises through the two cross-shelves $g\,h$ to the top $i$ of the machine, being supported in said top and also on said shelves, so as to turn freely therein. Above the upper shelf, $h$, a pinion, $m$, is fixed on the shaft $l$, which meshes with a train of change-wheels, $n\,n'\,n''$, mounted on said shelf, which gearing in turn meshes with a large gear-wheel, $o$, the hub of which rests on the upper shelf and turns in an opening therein. (See Figs. 1, 3, and 6.) Now, through the hub of this gear-wheel $o$ the drill-spindle $p$ passes, and extends down below the middle shelf, $h$, about half-way toward the lower shelf, $g$, while the upper end of the drill-spindle passes through the top $i$, and is supported thereby so as to turn freely therein, and protrudes above the top, so as to receive the drill-blank $q$ in the ordinary manner. The drill-spindle is engaged with the gear-wheel $o$ by means of the usual groove and key, as shown in the drawings, so that rotation of the gear-wheel will revolve the spindle, while at the same time an independent vertical motion may be imparted to the spindle to move it up or down through the gear-wheel and its bearing, as will be understood. This upright movement may be imparted to the spindle by the screw $r$, which is journaled at its lower end in the lower shelf, $g$, so as to be incapable of moving up or down therein, as seen best in Fig. 6, and the lower end of the screw is provided with a spiral gear-wheel, $s$, similar to the wheel $d$, with which it meshes, and from which it is driven, as seen in Figs. 1 and 4, so that the motion imparted from the driving-worm $c$ to the wheel $d$ causes both the shaft $l$ and the screw $r$ to revolve in unison. The rotation of the shaft $l$ through the gearing $m$ $n\ n'\ n''$ revolves the drill-spindle $p$, while the rotation of the screw $r$ tends to raise up the spindle, thereby imparting an ascending spiral movement to the spindle.

The mechanism therefore, so far as described, is substantially the same as set forth in my former patent, and it will be understood that above the top $i$ of the machine suitable milling mechanism (not shown) is mounted, which presents two revolving mills or cutters to the sides of the drill-blank $q$, held in the spindle, so that as the spindle is actuated by its mechanism the drill is fed up spirally between the cutters, and the desired spiral grooves are thus cut therein. When the spindle has been raised sufficiently far, so that the grooves have been cut to the proper length down on the drill-blank, a cam-collar, $p'$, on the spindle strikes a latch-lever, $k'$, which releases the lever $k$ and allows it to spring out, so as to ship the worm $c$ out of the gear-wheel $d$, as indicated by dotted lines in Fig. 4, thereby stopping the motion of the machine. The drill-spindle may now be run down to its starting-point by revolving the hand-crank $l''$, which is geared, through the bevel-gearing $l'$, with the shaft $l$, as shown best in Fig. 1, and the grooved drill may now be removed from the spindle and a fresh blank inserted, after which the lever $k$ is again moved inward against the stress of the spring $k''$ (see Fig. 2) and is caught by the latch $k'$, thus throwing the worm $c$ again into gear and starting the machine, as before.

The above description conveys a general idea of the construction and action of the machine, which, so far as described, is substantially the same as set forth in my former patent. It will be also noted that in my former patent the screw $r$ screwed directly into the base of the drill-spindle $p$, which acted as a nut relatively to said screw, and as the screw was of left-handed pitch, and as both spindle and screw revolved in the same direction—that is, to the right for right-handed drills—it followed that if the speed of screw and spindle were equal no progressive movement or lift would be imparted to the spindle; but if the speed of the screw was faster than the spindle an ascending spiral movement would be imparted to the spindle, due to the excess of the screw's rotation over the rotation of the spindle; hence by regulating the relative speeds of the spindle $p$ and screw $r$, which was effected by adjusting the change-wheels $n\ n'\ n''$, a spiral motion of any desired pitch within certain limits could be imparted to the spindle by means of this compound or differential-screw motion of the two parts—that is, the spindle $p$ and the screw $r$—but this pitch was always regular or uniform from the beginning to the end of the work, as will be understood. In my present improvement, however, the screw $r$, instead of screwing directly into the drill-spindle, screws into an intermediate or compound screw-nut, A, the exterior of which is also threaded and screws into the base of the drill-spindle, and this screw-nut is revolved by a train of gearing from a pair of reversed cones, B C, and a shifting-belt, D, whereby a spiral motion of variable or increasing pitch is imparted to the spindle, and which constitutes the chief improvement in my present invention.

The internal thread on the screw-nut A, corresponding to the thread on the screw $r$, is preferably coarse, or, say, four to the inch, while the external thread on the nut A, corresponding to the thread in the spindle, is preferably finer, or, say, twelve to the inch; but this may vary greatly, and these two threads may be right-handed or left-handed, or relatively reverse, according to the scope or adaptability of the machine; but I have shown them in the drawings as being both left-handed and of the relative pitches mentioned. Now, one of the cones or tapered pulleys, B, is keyed on the shaft $l$, this being the driving-cone, while the other or driven cone, C, is keyed to an independent shaft which is journaled at each end in the shelves $h\ g$, and from one cone to the other passes the driving-belt D. On the lower end of the shaft of the driven cone C is fixed a pinion, $t$, which meshes with a set of change-wheels, $t'\ t''$, which in turn mesh with a pinion, $u$, on a small grooved shaft, $v$, which rises alongside the drill-spindle $p$ and screw $r$, parallel therewith, (being journaled at each end in the shelves $h\ g$,) and on this shaft is keyed a sliding pinion, F, which meshes with a toothed rim or gear-wheel, $w$, on the intermediate screw or nut, A, the said pinion F having flanges which embrace the gear-wheel $w$ on the nut A, so that the pinion can keep in constant engagement with the nut while it slides up and down therewith on its shaft, as will be understood. Between the two cones a screw-shaft G rises vertically, and is journaled at each end in the shelves $g\ h$, so as to turn freely therein, yet be incapable of moving up or down. This screw-shaft is provided with a pinion, $y'$, at its base, which is driven from a pinion, $y$, on the shaft $l$ below the driving-cone B, through an intermediate pinion, $y''$. On the screw-shaft G a sliding block or cross-head, H, is engaged, in the manner of a nut, and is formed with forked arms $h'$, which project over and seize the belt D, in the manner of a belt-shipper, this cross-head being guided smoothly on the guide-rods $f'\,f'$, arranged as fully shown in Figs. 6, 4, and 1.

The entire mechanism, both old and new, being now described, we will consider the action thereof, assuming that the machine is started with the belt on the lower ends of the cones, as seen in Fig. 1. The machine being thus set in motion, the parts will revolve in the direction of the arrows, by which it will be noted that the shaft $l$ and its attachments revolve to the left while the screw $r$ and drill-spindle $p$ revolve to the right, while at the same time the intermediate screw-nut, A, revolves reversely to the spindle $p$ and screw $r$—that is, to the left. (See Figs. 1, 6, 3, 4, and 5.) Now, referring to Fig. 6, it will be noted that the main screw $r$ is restrained from any endwise or longitudinal movement, and hence while it revolves it neither rises nor falls; but as its thread is left-handed and revolves to the right in the nut A it hence raises or screws up the nut, and with it the spindle $p$, whereas the nut A, turning in the opposite direction on the screw $r$, also tends to screw up on the screw $r$, which two motions are added to each other, and thus increase the ascent of the spindle. Now, in opposition to these relative motions of the elements A $r$, the rotation of the nut A to the left in the spindle $p$ tends to screw the spindle down onto the nut, while the independent rotation of the spindle to the right on the said nut tends to increase the relative descent of the spindle onto the nut. Consequently the up-forcing tendencies of the screw $r$ in the nut A and the nut A on the screw $r$ are partly neutralized by the down-forcing tendencies of the nut A on the spindle $p$ and the spindle on the nut; but as the said up-forcing tendencies are always much greater than the down-forcing tendencies, by reason of the coarser screw-threads and the aggregate faster speeds of the up-forcing elements, the up-forcing tendencies preponderate upon the spindle, so that the actual motion of the spindle is an ascending spiral motion, being the result of the differences between the two series of tendencies. Hence by altering the relative speeds of the elements A $p$, which may be effected by altering the change-gearing in the machine, it is obvious that ascending spiral movements of different pitches may be imparted to the drill-spindle, suitable for various sizes or kinds of drills. For instance, while the motion of the screw $r$ is constantly uniform, the relative rotation of the screw-nut A may be altered by altering the change-wheels $t'\,t''$, and the relative rotation of the spindle $p$ may be altered by altering its change-wheels $n\,n'\,n''$, as will be readily understood.

One great advantage of this differential-screw mechanism is that on account of its several elements of motion a great range of pitch may be obtained with certain fixed pitches on the screw $r$ and nut A; and while it would be objectionable to use very fine or very coarse threads on the said parts, as the former would have little range and the latter would be weak and unsteady, yet by this means a strong medium pitch may be adopted on the said parts, and these pitches, by proper adjustment of the change-gearing, can then be added to each other and quadrupled, so as to impart a motion of very steep pitch to the drill-spindle; or, *per contra*, they can be put in the reverse relation, so as to impart a very fine spiral motion to the spindle, or in any relation intermediate between these extremes for any intermediate pitch, as will be readily appreciated. Now, whatever may be the pitch which the machine may be set to produce on the drill at its starting-point, this pitch will increase as the work proceeds toward the shank of the drill, as indicated in Fig. 1, for as the driving-cone B revolves it also rotates the screw G, which gradually raises the belt-shipping cross-head H, and thus shifts the belt D from the narrow end of the driving-cone and the large end of the driven cone to the opposite ends thereof, thus gradually increasing the rotation of the driven cone C, and consequently increasing the rotation of the screw-nut A, which is driven therefrom, while the rotation of the spindle $p$ and screw $r$ remains constant, which thus has the effect of greatly increasing the up-screwing motion of the spindle, and thus rendering the spiral motion of the spindle steeper as it proceeds, so that the grooves cut in the drill will therefore increase in steepness toward the shank, as indicated in Fig. 1, this result being the prime object of my invention.

Twist-drills with grooves of increasing pitch toward the shank are now much desired by mechanics, their advantage being in removing the chips faster from the bore, enabling the drill to cut freer and have less tendency to catch; and by means of my improved machine such drills can be produced rapidly and perfectly in different sizes, which thus presents an important improvement in drill-manufacture.

It will be readily understood that the spiral motion of the drill-spindle $p$ may be regulated so as to produce a fine or coarse pitch, suitable for small or large drills, by removing the change-wheels $n\,n'\,n''$ and $t'\,t''$ and inserting others of different size, which will be provided for the purpose. These change-wheels, as illustrated, are mounted, in the usual manner, on movable studs 8 upon swinging arms 5, provided with clamp-nuts 3, whereby the wheels may be removed, changed, and adjusted into position, as will be readily understood.

I have shown the threads on the screw $r$ and screw-nut A as both left-handed; but, if desired, the threads on the exterior of nut A may be right-handed, and this, with the left-hand screw $r$, will produce more variation in the actual screw motion of the spindle—that is, it will give a spiral motion of coarser pitch—and will be better suited for machines adapted for large drills, whereas the arrangement illustrated is best for smaller sizes of drills, where the grooves are necessarily of slighter pitch.

The cones B C are of course arranged reversely to each other, the broad end of one being opposite the narrow end of the other, and both cones may be of the same shape, with straight tapering sides, or tapering sides slightly crowning toward the center, in the usual manner of pulleys; but I much prefer to make the cones with a curved taper reversed relatively to each other—that is, one being made with a convex taper and the other with a concave taper, as fully shown in Fig. 1—which form is much preferable and almost essential, in order to produce a sufficient variation in the rotation from the beginning to the end of the work, so that the spiral motion of the spindle $p$ will increase in steepness in proper regular ratio from the beginning to the end. By altering the taper and curve of the cones different characteristics may be given to the grooves cut in the drill—that is, their spiral increase may be more or less abrupt, as will be readily understood, and it will also be understood that by reversing the action of the cones the spiral motion of the spindle $p$ may be made to progressively decrease, instead of increase, if desired.

I do not confine myself to the differential-screw mechanism shown for producing a spiral motion of the spindle, as any equivalent mechanical movement, whether of the nature of differential screws or others, may be employed in combination with the cones B C, their automatically-shifted belt D, and necessary operative connection between the said parts, so as to impart an accelerating spiral movement to the drill-spindle, in substantially the manner set forth, without departing from the main feature of my invention.

The differential-screw mechanism may be modified, as shown in Fig. 8. In this case the intermediate screw, A', screws into the fixed support $g$, and has a smooth bore through which the plain lower end of the screw-shaft $r'$ passes, the upper end of which is threaded and screws directly into the drill-spindle $p$, while its middle part has a flanged base, which rests on the intermediate screw, A', and a fixed collar below said screw A'. The lower end of the screw-shaft $r'$ is loosely keyed to its driving gear-wheel $s$, so that the screw-shaft is free to slide up and down through it as the movement of the intermediate screw, A', up or down may cause it. The driving-pinion $u'$ of the intermediate screw has elongated teeth and meshes with the spur-teeth on the screw A'. This mechanism, as will be readily understood, will have a similar action to that previously described, but possesses a simpler construction; and it also possesses less elements of motion than the former, which has four elements, while this has but three— that is to say, this modification has these three elements of motion: first, the action of the screw $r'$ on the spindle $p$; second, the action of the spindle $p$ on the screw $r'$; third, the action of the intermediate screw, A', on both. The screw $r'$ being left-handed, and revolving to the right in the same direction as the spindle $p$, it follows that if the speeds of both parts are the same no progressive motion will be imparted to the spindle, whereas if the speed of the screw is a little faster than the spindle the screw will raise or screw up the spindle proportionately to the difference, and vice versa. At the same time, if the thread of the intermediate screw, A', is left-handed and it revolves to the left, reverse to the spindle $p$ and screw $r$, each revolution of the said screw A' will raise the screw $r'$ and its spindle $p$ the distance of one thread. It is therefore obvious that by varying the rotary speeds of each of the three elements, the spiral motion imparted to the spindle may be made of coarser or finer pitch, as required.

It will be readily understood that the compound differential-screw mechanism herein set forth, which forms one part of my present invention, may be used without the increasing or decreasing cones when the machine is adapted for work of uniform pitch, if desired.

Referring to Fig. 4, it will be understood that instead of employing a single fixed gear-wheel, $y'''$, between the driven cone B and the belt-shipping screw-shaft G, a change-wheel or set of change-wheels may be used, whereby the motion of the belt-shipper may be varied relatively to the driven cone, so as to better adapt the machinery for drills of different pitches. Again, instead of driving the belt-shipping screw-shaft G from the shaft of the driving-cone B, it may be driven from the shaft of the driven cone C, which will thus produce a much greater rate of variation or acceleration in the speed of the driven cone, as will be readily understood.

I am of course aware that a pair of reversed driving-cones with a belt automatically shifted thereon to obtain a gradually increasing or decreasing rotary motion is not in itself new; but this has not been combined with a screw-spindle or with a differential-screw mechanism, as in my case, whereby a spiral motion of variable pitch is produced.

What I claim as my invention is—

1. The combination, with the spindle $p$ and with differential-screw mechanism for imparting thereto a spiral movement, of variable rotary driving mechanism, substantially such as set forth, for imparting a progressively increasing or decreasing rotation to said screw mechanism, and thereby rendering the spiral movement of said spindle progressively increasing or decreasing, substantially as herein set forth.

2. The combination, with the spindle $p$ and mechanism, substantially such as set forth, for imparting to said spindle a combined rotary and longitudinal or spiral movement, of the reversely-tapered pulleys or driving-cones B C, and automatically-shifting belt D, through which motion is imparted to the aforesaid mechanism of the spindle, whereby the spiral movement thereof is progressively increased as it proceeds, substantially as and for the purpose set forth.

3. The combination, with the spindle $p$ and with mechanism for revolving the same and mechanism for simultaneously imparting thereto a longitudinal movement, of the reversely-tapered pulleys or cones B C, their belt D, and an automatic belt-shipper, through which motion is imparted to the mechanism for moving the spindle longitudinally, said pulleys being formed, respectively, with concavely and convexly curved tapered peripheries, substantially as and for the purpose herein set forth.

4. The combination, with the spindle $p$, of the cones B C, belt D, automatic shipper H, screw G, operating said shipper, and gearing driving said screw, and mechanism for imparting a spiral movement to said spindle, and connecting gearing between said mechanism and said cones, arranged and operating substantially as and for the purpose set forth.

5. The combination, with the spindle $p$, of differential-screw mechanism, consisting of a primary screw and an intermediate screw connected with both the spindle and primary screw, substantially as herein set forth, and with rotating mechanism for revolving the spindle, primary screw, and intermediate screw independently of each other, whereby a compound differential-screw action is produced between the three parts to impart a definite spiral movement to the spindle, substantially as herein shown and described.

6. The combination, in a machine of substantially the described kind, with the spindle $p$, of differential-screw mechanism, consisting of the screw $r$, intermediate screw-nut, A, screwing on the screw $r$ and into the spindle $p$, and suitable mechanism for independently revolving said spindle, nut, and screw, substantially as and for the purpose set forth.

7. The combination, with the spindle $p$, of the screw-nut A and screw $r$, engaged, as shown, and with gearing for revolving said spindle and said screw, and the rotary shaft $v$, and gearing for revolving the same, and the sliding pinion F on said shaft gearing with the said screw-nut A, substantially as shown and described.

8. The combination, with the spindle $p$, of the shaft $l$ and screw $r$, geared together by wheels $d\ s$, the driving-cone B, driven cone C, and their belt D, and automatic belt-shipper driven from shaft $l$, and the intermediate screw-nut, A, engaged with spindle $p$, and screw $r$, connecting changeable gearing between said screw-nut A and the driven cone C, and connecting changeable gearing between the spindle $p$ and shaft $l$, substantially as and for the purpose set forth.

ANDREW R. ARNOLD.

Witnesses:
JOHN A. CARPENTER,
SETH STODDARD.